May 9, 1944.   E. S. AKER   2,348,274
SHAFT JOURNALING MEANS
Filed July 28, 1943

INVENTOR.
Evender S. Aker,
BY George D. Richards,
Attorney

Patented May 9, 1944

2,348,274

UNITED STATES PATENT OFFICE 2,348,274

SHAFT JOURNALING MEANS

Evender S. Aker, Belleville, N. J.

Application July 28, 1943, Serial No. 496,384

10 Claims. (Cl. 308—240)

This invention relates, generally, to improvements in means for journaling rotatable shafts in their supporting bearings; and the invention has reference, more particularly, to an improved construction of journal made of non-metallic material, preferably rubber, for rotatably supporting a shaft in its bearing, said journal being provided with means for delivering lubricating water to and between the engaged faces of the journal and bearing, whereby the journal is self-lubricating, and especially adapted to serve a water submerged shaft, such e. g. as the propeller shaft of a power driven boat.

The invention has for an object to provide a novel construction of rubber or similar non-metallic journal for a shaft provided with means to receive lubricating water and, under centrifugal force developed by the rotation of the shaft and journal, thereupon to deliver the water through substantially radial passages in the journal to and between the engaged faces of the journal and a cooperating bearing, whereby to constantly subject such surfaces to water lubrication.

The invention has for another object to provide a self water-lubricated shaft journal characterized as above stated, including novel means for mounting the same upon and affixing it to a shaft to be served thereby.

Other objects of the invention, not at this time more particularly enumerated, will be understood from the following detailed description of the same.

Figure 1:
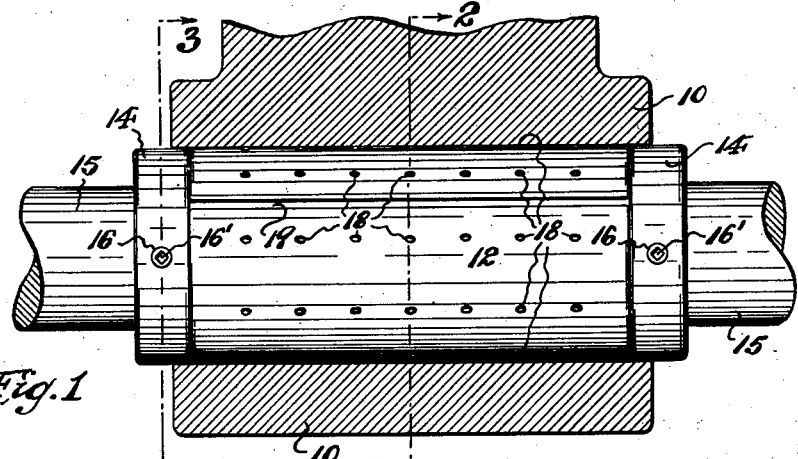
Figures 2, 3:
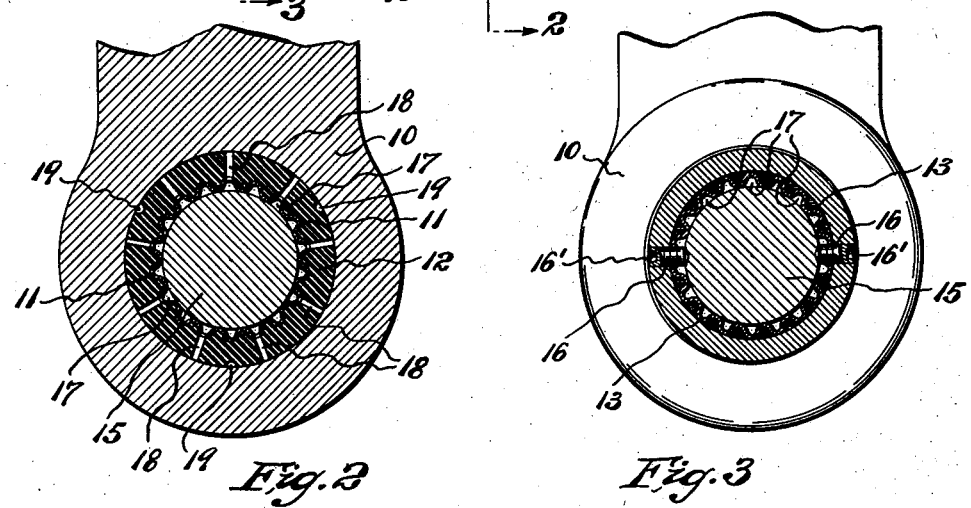
Figure 4:
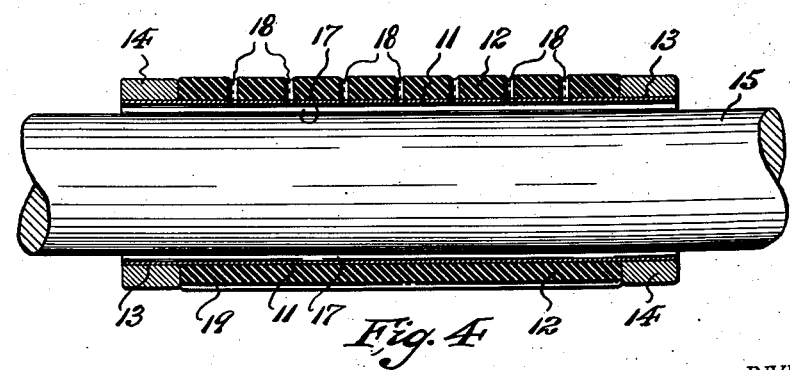

An illustrative embodiment of the invention is shown in the accompanying drawing, in which: Fig. 1 is an elevational view of a shaft provided with a self water-lubricated journal according to the invention as mounted in a supporting bearing, said bearing being shown in section; Fig. 2 is a cross sectional view of the same, taken on line 2—2 in Fig. 1; Fig. 3 is another cross sectional view, taken on line 3—3 in Fig. 1; and Fig. 4 is a longitudinal sectional view of the journal structure, with the shaft shown in elevation.

Similar characters of reference are employed in the above described views, to indicate corresponding parts.

The shaft journal of this invention is adapted to be used on shafts which are submerged in water, as e. g. the external end of a boat propeller shaft, which is usually supported adjacent to its propeller carrying end by a suitable external bearing 10 affixed to the boat stern. It will be obvious, however, that the shaft journal of this invention may be employed for machinery shafts of all kinds, especially where such shafts are operated under wet conditions, or wholly or partially submerged in water.

The journal according to this invention comprises an inner carrier sleeve 11 of rigid material, such as metal, said sleeve being of corrugated cross-sectional shape, with the corrugations disposed lengthwise to extend from end to end thereof.

Mounted on said sleeve 11 is an external cylindrical journal body 12 of substantial wall thickness. Said journal body is made of non-metallic material. For example, the same is preferably made of vulcanized rubber or similar non-metallic material of a character adapted to have its surface frictional resistance substantially reduced when wet. I have found that both hard and soft or comparatively soft vulcanized rubber to be very satisfactory in this respect.

Said journal body 12 may be molded onto and about the carrier sleeve 11, so that the material of the former enters and fills the external channels of the sleeve corrugations, thus strongly interlocking the sleeve and journal body together against relative rotational displacement. On the other hand, the journal body 12 may be separately produced as a tubular formation having an internal diameter less than that of the maximum external diameter of the corrugated sleeve, whereby the journal body may be telescopically forced or driven endwise over the sleeve, so as to force the material of the former into the external channels of the sleeve corrugations, with like interlocking of the sleeve and journal body against relative rotational displacement.

The journal body 12 is made of less length than that of the carrier sleeve 11, whereby, when the former is mounted on the latter as above described, and disposed intermediate the ends of the sleeve, free end portions 13 of the sleeve will project exteriorly beyond the respective ends of said journal body. Mounted on and suitably affixed to the projecting free end portions 13 of said carrier sleeve are end collars 14. These collars are preferably made of metallic material, and are of an external diameter substantially corresponding to the external diameter of the journal body 12; preferably, however, being of slightly less diameter.

The minimum internal diameter of the carrier sleeve 11 corresponds to that of a shaft 15 upon which the journal is to be mounted and by which it is to be served; these diametric relations being such that the carrier sleeve may be telescopically driven onto the shaft 15 with a tight fit. The journal may then be suitably secured to the shaft against both rotational and longitudinal displacement, and so as to rotate with the shaft. An illustrative means for so affixing the journal to the shaft, as shown in the drawing, comprises one or more set screws 16 threaded through each collar 14 and through the sleeve end portions 13, so as to bite or grip against the shaft 15. Preferably said set-screws 16 are of the countersinking type, having wrench receiving sockets 16' in their outer ends, engageable by a suitable wrench key for manipulation and tightening home thereof.

When the journal structure is operatively mounted on and affixed to the shaft 15 as described, the internal channels of the carrier sleeve corrugations will be opposed to the shaft surface to extend contiguously therealong. Said internal channels being open from end to end of the journal structure, the same provide through passages 17 for the reception and flow of water along the inner side or interior of the journal structure, being thus spaced radially inward from the external bearing surface of the journal body 12. Extending outwardly from selected water flow passages 17 through the carrier sleeve wall and thence through the journal body 12, to emerge at the external bearing surface of the latter, are radial water delivery passages 18. These delivery passages 18 may be selectively arranged in any suitable manner as to number and grouping, but preferably so as to discharge water therefrom at a multiplicity of symmetrically spaced points on and about the external bearing surface of the journal body and upon the contiguous surface of the bearing 10 in which the latter is rotatably supported.

Under operating conditions, with the bearing 10 and journal equipped shaft 15 submerged in water, lubricating water will enter, fill and constantly flow through the flow passages 17 from end to end thereof. As the shaft 15 and its journal structure rotates within the bearing 10, the water masses within the flow passages 17 will be subjected to centrifugal force, whereby delivery of water from said flow passages 17 outwardly through the radial delivery passages 18 will be induced, and consequently lubricating water will be continuously discharged from the outlets of said delivery passages 18 between and upon the engaged bearing surfaces of the journal body 12 and upon the contiguous surface of the bearing 10 in which said journal body rotates. This action is analogous to a constant pumping action whereby lubricating water is continuously brought from the interior of the journal structure to the exterior thereof, so as to spread upon the external surface of the latter, and thereby to form and maintain a lubricating water film which uniformly bathes and lubricates the opposed surfaces of the rotating journal body 12 and the stationary bearing 10.

Although not absolutely essential, means may be provided for assisting the spreading of the discharged lubricating water in lubricating film formation on and between said opposed surfaces of the rotating journal body 12 and the stationary bearing. In an illustrative form of such means, the same may comprise one or more channels or grooves 19 formed in the external surface of the bearing body 12 to extend substantially longitudinally from end to end thereof. Water discharged at the external surface of the journal body will collect in and fill said groove or grooves 19 from end to end, and since the latter are open toward the opposed surface of the bearing 10, the water therein will be wiped therefrom and spread upon said bearing surface as the journal body rotates, thereby to further assure formation of a uniformly spread lubricating water film between the opposed surfaces of the rotating journal body 12 and said surface of the bearing 10. The groove or grooves 19 also provide clearance for reception of sand or grit so as to prevent accumulations thereof directly between the opposed bearing surfaces; while at the same time providing ways through which any collected sand or grit may be washed away and caused to escape by discharge from the open end portions of said groove or grooves.

When the journal equipped shaft according to this invention is used as a submerged boat propeller shaft, the movement thereof through the water, in either forward or sternward direction, will assure entrance of water into the flow passages 17 from the surrounding mass of water in which the shaft is submerged, since said flow passages are through passages, open from end to end, and substantially parallel to the direction of either forward or sternward movement of the structure through the water.

I am aware that some changes could be made in the above described shaft journaling means without departing from the scope of this invention as defined in the following claims. It is therefore intended that all matter contained in the foregoing description or shown in the accompanying drawing shall be interpreted as illustrative and not in a limiting sense.

I claim:

1. A device for journaling a shaft in a bearing comprising a cylindrical journal structure affixed to said shaft in surrounding relation thereto, said journal structure having a bearing surface portion of non-metallic material, means spaced inwardly from the bearing surface of said journal structure adapted to provide water receiving spaces, and said journal structure having radial water delivery passages leading outwardly from said receiving spaces to emerge at its bearing surface, whereby centrifugal force induced by rotation of the shaft and journal structure discharges lubricating water from said receiving spaces onto opposed bearing surfaces of the journal structure and the bearing in which it is supported.

2. A device for journaling a shaft in a bearing comprising a cylindrical journal structure affixed to said shaft in surrounding relation thereto, said journal structure having an external rubber bearing portion, means spaced inwardly from the outer surface of said bearing portion adapted to provide water receiving spaces, and said journal structure having radial water delivery passages leading outwardly from said receiving spaces through said rubber bearing portion to its outer surface, whereby centrifugal force induced by rotation of the shaft and journal structure discharges lubricating water from said receiving spaces onto opposed surfaces of said journal bearing portion and the bearing in which it is supported.

3. A device for journaling a shaft in a bearing comprising a lengthwise corrugated rigid carrier sleeve affixed to said shaft in surrounding relation thereto, channels of the sleeve corrugations being open end to end and adapted to provide water flow channels, a cylindrical non-metallic journal body of substantial wall thickness surrounding said sleeve, and said body having radial water delivery passages extending outwardly from water flow channels to the external bearing surface of said body.

4. A device for journaling a shaft in a bearing comprising a lengthwise corrugated rigid carrier sleeve affixed to said shaft in surrounding relation thereto, internal channels of said sleeve corrugations providing water flow channels intermediate said sleeve and shaft and open from end to end, a cylindrical non-metallic journal body of substantial wall thickness surrounding said sleeve and interlocked with external channels of said sleeve corrugations, whereby said sleeve and body are mutually joined and held against relative displacement, and said sleeve and body having radial water delivery passages extending outwardly from water flow channels to the external bearing surface of said body.

5. A device for journaling a shaft in a bearing comprising a lengthwise corrugated rigid carrier sleeve affixed to said shaft in surrounding relation thereto, internal channels of said sleeve corrugations providing water flow channels intermediate said sleeve and shaft and open from end to end, a cylindrical rubber journal body of substantial wall thickness surrounding said sleeve and having its internal portion interlockingly imbedded in the external channels of said sleeve corrugations, whereby to hold said sleeve and body against relative rotational displacement, and said sleeve and body having radial water delivery passages extending outwardly from water flow channels to the external bearing surface of said body.

6. A device for journaling a shaft in a bearing comprising a lengthwise corrugated rigid carrier sleeve mounted around said shaft, channels of said sleeve corrugations being open from end to end and adapted to provide water flow channels, a cylindrical non-metallic journal body of substantial thickness surrounding the intermediate portion of said sleeve whereby to provide free end portions of said sleeve projecting beyond the ends of said body, collars mounted on said sleeve free end portions, fastening means engaged through said collars and sleeve end portions for affixing the journaling device to said shaft, and said body having radial water delivery passages extending outwardly from water flow channels to the external bearing surface of said body.

7. A device for journaling a shaft in a bearing comprising a lengthwise corrugated rigid carrier sleeve mounted around said shaft, internal channels of said sleeve corrugations providing water flow channels intermediate said sleeve and shaft and open from end to end, a cylindrical rubber journal body of substantial wall thickness surrounding the intermediate portion of said sleeve whereby to provide free end portions of said sleeve projecting beyond the ends of said body, collars mounted on said sleeve free end portions and abutting the ends of said journal body, fastening means engaged through said collars and sleeve end portions for affixing the journaling device to said shaft, and said sleeve and body having radial water delivery passages extending outwardly from water flow channels to the external bearing surface of said body.

8. A device for journaling a shaft in a bearing as defined in claim 1, wherein the journal structure is provided with at least one substantially longitudinally extending clearance groove indenting its external bearing surface from end to end thereof.

9. A device for journaling a shaft in a bearing as defined in claim 3, wherein the journal body is provided with at least one substantially longitudinally extending clearance groove indenting its external bearing surface from end to end thereof.

10. A device for journaling a shaft in a bearing as defined in claim 5, wherein the rubber journal body is provided with at least one substantially longitudinally extending clearance groove indenting its external bearing surface from end to end thereof.

EVENDER S. AKER.